United States Patent [19]

Yamamoto et al.

[11] Patent Number: 5,109,377
[45] Date of Patent: Apr. 28, 1992

[54] MAGNETO-OPTICAL RECORDING MEDIUM AND METHOD OF PRODUCING THE SAME

[75] Inventors: Ryoichi Yamamoto; Takashi Yamada; Satoshi Matsubaguchi; Akira Nahara, all of Odawara, Japan

[73] Assignee: Fuji Photo Film Co., Ltd., Kanagawa, Japan

[21] Appl. No.: 396,922

[22] Filed: Aug. 22, 1989

[30] Foreign Application Priority Data

Aug. 22, 1988 [JP] Japan .................. 63-207549
Aug. 29, 1988 [JP] Japan .................. 63-214521

[51] Int. Cl.⁵ .................................. G11B 7/24
[52] U.S. Cl. ...................... 369/288; 369/283
[58] Field of Search .............. 369/272, 275.1, 275.2, 369/275.3, 275.4, 275.5, 283, 286, 288, 292; 361/131; 428/694, 697, 900

[56] References Cited

U.S. PATENT DOCUMENTS

| | | |
|---|---|---|
| 4,569,881 | 2/1986 | Freese et al. ............... 369/13 X |
| 4,615,944 | 10/1986 | Gardner ...................... 369/13 X |
| 4,658,388 | 4/1987 | Ishiwatari et al. ........... 369/288 X |
| 4,735,698 | 4/1988 | Nomura et al. .............. 369/288 X |
| 4,782,477 | 11/1988 | Ichihara et al. .............. 369/288 X |
| 4,797,331 | 1/1989 | Watada et al. ............... 369/288 X |
| 4,822,675 | 4/1989 | Funkenbusch et al. ....... 369/288 X |
| 4,823,220 | 4/1989 | Milster et al. ................ 369/13 |
| 4,831,608 | 5/1989 | Tsukane et al. ............. 369/288 X |
| 4,839,883 | 6/1989 | Nagata et al. ............... 369/288 X |
| 4,855,992 | 8/1989 | Ikegawa et al. ............. 369/288 X |

Primary Examiner—William M. Shoop, Jr.
Assistant Examiner—David Martin
Attorney, Agent, or Firm—Sixbey, Friedman, Leedom & Ferguson

[57] ABSTRACT

A magneto-optical recording medium has a substrate and a recording layer which is formed on the substrate. The recording layer is formed of a plurality of transition metal films and a plurality of rare earth metal films which are alternately formed one on the other, and at least a metal selected from the group consisting of Cr, Al and Ti is contained in the rare earth metal films or the transition metal films.

11 Claims, 3 Drawing Sheets

1

MAGNETO-OPTICAL RECORDING MEDIUM AND METHOD OF PRODUCING THE SAME

BACKGROUND OF THE INVENTION

1. Field of the Invention

This invention relates to a magneto-optical recording medium which is used for the image recording, a large capacity data file and the like and a method of producing the same.

2. Description of the Prior Art

A magneto-optical recording medium which has various advantages, e.g., it can record information at a high density, has a large capacity, it can record and reproduce information without mechanical contact with a head, and it permits easy erasing and rerecording, has been put into wide use as a large capacity data file, a recording medium for image recording or the like. In various magneto-optical recording media, those which comprise a substrate and a recording layer in the form of a thin film containing rare earth metal and transition metal as the major components exhibit excellent magneto-optical recording properties. For example, a magneto-optical recording medium which has a recording layer in the form of a thin film of a rare earth metal-transition metal alloy such as TbFe alloy is disclosed in Japanese Patent Publication No. 57(1982)-20691. In Japanese Patent Publication No. 59(1984)-217247, a magneto-optical recording medium which has a recording layer consisting of alternate rare earth metal film and transition metal film (Tb and Fe) is disclosed.

However, the rare earth metal film and the transition metal film, especially the former, are very apt to oxidize, and the properties of the recording layer are apt to deteriorate with time. In order to overcome this problem, there have been made various propositions. For example, it has been proposed to prevent the recording layer from oxidizing by a pair of protective layers which are in the form of dielectric films formed of SiN, $Al_2O_3$, $SiO_2$, ZnS, AlN, AlSiN or combination of these materials, and are formed on opposite sides of the recording layer. See Japanese Unexamined Patent Publication Nos. 57(1982)-27945, 62(1987)-28753, 59(1984)-121368, and 60(1985)-80144, for example. Also it has been proposed to add Pt, Cr, Al or Ti to the rare earth metal-transition metal film as disclosed in "Jitsumu Hyoumen Gijutsu", page 228, Vol. 32 (No. 5), 1985, "Nippon Ouyou Jikigakkaishi", page 197, Vol. 11, (No. 2), 1987, and Japanese Unexamined Patent Publication Nos. 49(1974)-60643, 59(1984)-96714 and 62(1987)-293537.

However, the former proposition is disadvantageous in that aging permits oxygen and or water to permeate the protective layers and cause the recording layer to rust, and oxygen and water can reach the recording layer through a pin hole or crack in the protective layers and cause the recording layer to rust. Though the function of the protective layer can be enhanced when the thickness of the protective layer is increased, it can cause warpage of the magneto-optical recording medium.

When Pt, Cr, Al or Ti is added to the rare earth metal-transition metal film in accordance with the latter proposition, the resistance to corrosion of the recording layer is increased. However, if such metal is added to the recording layer by such an amount that the resistance to corrosion of the magneto-optical recording medium is sufficiently increased, the magneto-optical properties of the recording layer deteriorate and the Kerr rotational angle $\theta k$ is reduced, which deteriorates the C/N ratio of the magneto-optical recording medium.

SUMMARY OF THE INVENTION

In view of the foregoing observations and description, the primary object of the present invention is to provide a magneto-optical recording medium which has improved resistance to corrosion and improved magneto-optical properties, and exhibits excellent shelf stability and an excellent C/N ratio.

Another object of the present invention is to provide a method of producing the magneto-optical recording medium.

In accordance with a first aspect of the present invention, there is provided a magneto-optical recording medium having a substrate and a recording layer which is formed on the substrate and is in the form of a thin film containing rare earth metal and transition metal as the major components characterized in that said recording layer comprises a plurality of transition metal films and a plurality of rare earth metal films which are alternately formed one on the other, and at least a metal selected from the group consisting of Cr, Al and Ti is contained in the rare earth metal films.

In accordance with a second aspect of the present invention, there is provided a magneto-optical recording medium having a substrate and a recording layer which is formed on the substrate and is in the form of a thin film containing rare earth metal and transition metal as the major components characterized in that said recording layer comprises a plurality of transition metal films and a plurality of rare earth metal films which are alternately formed one on the other, and at least a metal selected from the group consisting of Cr, Al and Ti is contained in the transition metal films.

DETAILED DESCRIPTION OF THE INVENTION

Figure 1:
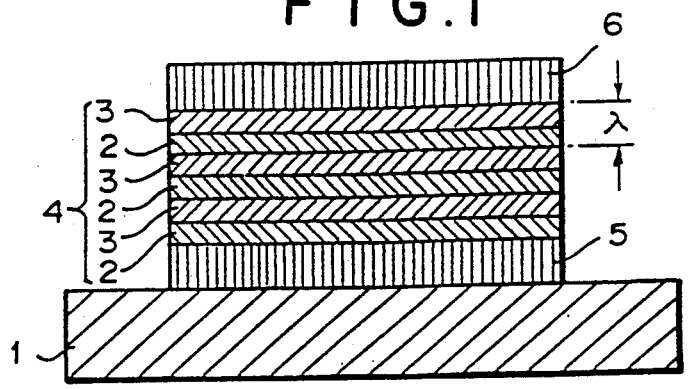
FIG. 1 is a cross-sectional view showing an embodiment of the present invention.
Figure 2:
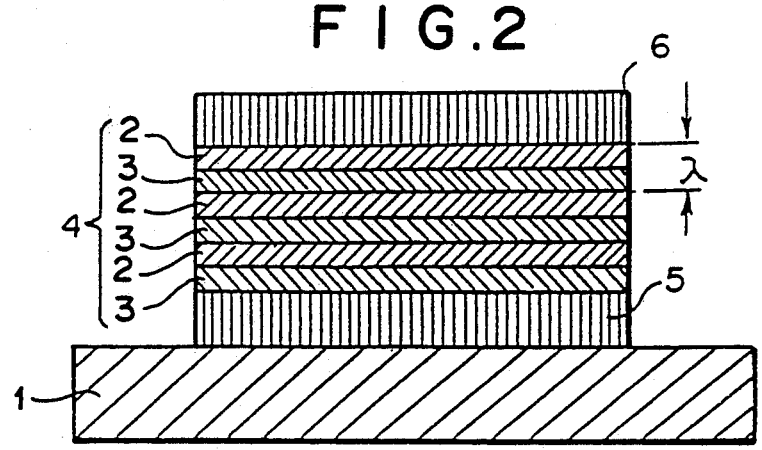
FIG. 2 is a cross-sectional view showing another embodiment of the present invention.

FIGS. 1 and 2 show different examples of the layer arrangement of the magneto-optical recording medium in accordance with the present invention. In FIG. 1 or 2, a recording layer 4 sandwiched between a pair of dielectric protective layers 5 and 6 is formed on a substrate 1. The recording layer 4 comprises a plurality (three in this particular embodiment) of transition metal films 2 and a plurality (three in this particular embodiment) of rare earth metal films 3 which are alternately formed one on the other. In the arrangement shown in FIG. 1, the layer nearest to the substrate is the transition metal film 2 and, in the arrangement shown in FIG. 2, the layer nearest to the substrate is the rare earth metal film 3. If desired, the recording layer 4 and the protective layers 5 and 6 may be covered with a resin protective layer.

In the magneto-optical recording medium in accordance with the first aspect of the present invention, at least one of Cr, Al and Ti is contained in the rare earth metal films 3. It has been found that addition of Cr, Al and/or Ti to the rare earth metal film 3 sufficiently increases the resistance to corrosion of the recording layer 4. This may be because, since corrosion of the recording layer 4 is mainly due to oxidization of the rare earth metal, the addition of Cr, Al and/or Ti to the rare earth metal film 3 is particularly effective in increasing the resistance to corrosion of the recording layer 4. Unlike in the prior art magneto-optical recording medium where Cr, Al and/or Ti is added to a recording layer which is of a single layer and in which rare earth metal and transition metal coexist as an alloy, the magneto-optical properties do not deteriorate and the Kerr rotational angle $\theta k$ is not reduced when Cr, Al and/or Ti is added only to the rare earth metal film 3, whereby a magneto-optical recording medium which is excellent in the shelf stability and the C/N ratio can be obtained. That is, since the transition metal film 2 is added with none of Cr, Al and Ti, the magnetic moment of Fe, Co and the like cannot be deteriorated due to the interaction between the transition metal atoms in the transition metal film 2 and Cr, Al or Ti. Accordingly, reduction of the Kerr rotational angle $\theta k$ due to deterioration of the magneto-optical properties can be avoided.

Among the metals Cr, Al and Ti, Cr is most preferred.

In the magneto-optical recording medium in accordance with the second aspect of the present invention, at least one of Cr, Al and Ti is contained in the transition metal films 2. It has been found that addition of Cr, Al and/or Ti to the transition metal film 2 sufficiently increases the resistance to corrosion of the recording layer 4. It may be considered that the metal added to the transition metal film 2 increases the transition metal films' own resistance to corrosion and at the same time, the transition metal films 2 increased with their resistance to corrosion by the metal added thereto function as protective layers for the rare earth metal films 3. Unlike in the prior art magneto-optical recording medium where Cr, Al and/or Ti is added to a recording layer which is of a single layer and in which rare earth metal and transition metal coexist as an alloy, the magneto-optical properties do not deteriorate and the Kerr rotational angle $\theta k$ is less reduced when Cr, Al and/or Ti is added only to the rare earth metal film 3, whereby a magneto-optical recording medium which is excellent in the shelf stability and the C/N ratio can be obtained. That is, when Cr, Al and/or Ti is added to only the transition metal film layer 2, the resistance to corrosion of the recording layer 4 can be sufficiently increased by less amount of Cr, Al and/or Ti, and accordingly, the deterioration of the magneto-optical properties is less.

Among the metals Cr, Al and Ti, Cr is most preferred.

In accordance with the method of the present invention, first and second targets are disposed at a predetermined distance from each other in a sputter chamber which is kept at a predetermined vacuum, and the first and second targets are simultaneously and continuously sputtered while a substrate is passed alternately above the first and second targets at a predetermined distance therefrom at a constant speed.

When the magneto-optical recording medium in accordance with the first aspect of the present invention is produced, the first target is formed of transition metal and the second target is formed of rare earth metal and at least a metal selected from the group consisting of Cr, Al and Ti. On the other hand, when the magneto-optical recording medium in accordance with the second aspect of the present invention is produced, the first target is formed of rare earth metal and the second target is formed of transition metal and at least a metal selected from the group consisting of Cr, Al and Ti.

Figure 3:
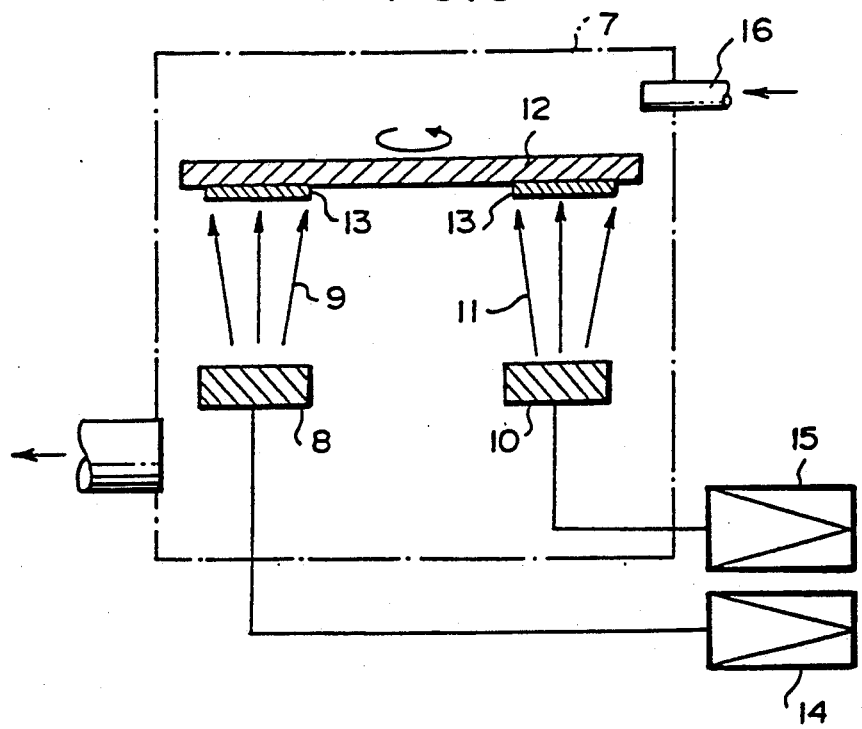
FIG. 3 shows a system for carrying out the method of the present invention.

FIG. 3 shows a system for carrying out the method of the present invention. In FIG. 3, first and second targets 8 and 10 are disposed in a sputter chamber 7. The first and second targets 8 and 10 are spaced from each other so that sputtered particles 9 from the first target 8 and sputtered particles 11 from the second target 10 do not mingle together. A rotary substrate holder 12 is provided above the first and second targets 8 and 10 in parallel to the targets 8 and 10 and is equidistant from the targets 8 and 10. The rotary substrate holder 12 is rotated at a constant speed with pair of substrates 13 fixed thereon. Thus, the substrate 13 is passed alternately above the first and second targets 8 and 10 at a predetermined distance therefrom at a constant speed. The sputter chamber 7 is kept at a predetermined vacuum and a predetermined electric power is supplied to the first and second targets 8 and 10 from respective sputtering power sources 14 and 15, thereby continuously and simultaneously sputtering the first and second targets 8 and 10.

When the X-ray diffraction pattern of the recording layer 4 of the magneto-optical recording medium of the present invention is measured, it will be found that the composition of the recording layer 4 periodically changes in the direction of the thickness thereof. The period thus measured will be referred to as "the period of lamination $\lambda$ of the recording layer 4", in this specification. Further, the thickness of a single transition metal film or a single rare earth metal film can be known through the relation between the sputtering conditions (e.g., the rotational speed of the substrate holder, the power supplied to the target, the sputtering time) and the thickness of the obtained film when a single film is formed with one of the first and second targets being sputtered. The thickness of a single transition metal film or a single rare earth metal film can also be known by a composition analysis of the recording layer 4.

In the case of the magneto-optical recording medium in accordance with the first aspect of the present invention, the period of lamination $\lambda$ of the recording layer 4 is preferably 6 to 60 A and more preferably 10 to 30 A. When the period of lamination $\lambda$ of the recording layer 4 is too small, the effect of the alternate lamination is lowered so that the resistance to corrosion cannot be improved unless a substantial amount of Cr, Al and/or Ti is added. However, if Cr, Al and/or Ti is added in a too large amount, the magneto-optical properties are lowered. That is, when the period of lamination $\lambda$ of the recording layer 4 is too small, the resistance to corrosion and the magneto-optical properties cannot be consistent with each other. On the other hand, if the period of lamination $\lambda$ of the recording layer 4 is too large, the films cannot be perpendicularly magnetized, which is not preferable.

The amount of Cr, Al and/or Ti to be contained in the rare earth metal film is preferably 0.4 to 18.0 atomic % of the whole recording layer 4 and more preferably 3.0 to 12.0 atomic % of the same. If the amount is less than 0.4 atomic %, the effect of improving the resistance to corrosion of the recording layer 4 is insufficient, and on the other hand, if the amount is more than 18.0 atomic %, the squareness ratio of the Kerr hysteresis loop deteriorates and the Kerr rotational angle $\theta k$ is reduced. The Cr, Al and/or Ti content can be determined by the atomic absorptiometric analysis, the X-ray fluorometric analysis, the ICP emission spectrum analysis or the like.

The Cr, Al and/or Ti content in the rare earth metal film can be controlled by adjustment of the Cr, Al and/or Ti content in the second target 10. That is, the second target 10 may be of an alloy of rare earth metal and at least one of Cr, Al and Ti having a controlled Cr, Al and/or Ti content, or may be a rare earth metal target having thereon a chip which is formed of at least one of Cr, Al and Ti and is in a controlled amount.

The rare earth metal film may comprise a single heavy or light rare earth metal such as Tb, Gd, Dy, Nd or Sm, may comprise an alloy of such rare earth metals. Among those metals, Tb, Gd, Dy, Nd, TbDy, TbNd, TbGd, or NdDy is preferred. The transition metal film normally comprises FeCr, CoCr or FeCoCr though Ni may be contained in those alloys.

Preferable combinations of the metals forming the transition metal films and the rare earth metal films are FeCo/TbCr, FeCo/GdTbCr, FeCo/DyTbCr, FeCo/DyGdCr, FeCo/NdTbCr, and FeCo/GdNdCr.

Also in the case of the magneto-optical recording medium in accordance with the second aspect of the present invention, the period of lamination $\lambda$ of the recording layer 4 is preferably 6 to 60 A and more preferably 10 to 30 A. When the period of lamination $\lambda$ of the recording layer 4 is too small, the effect of the alternate lamination is lowered so that the resistance to corrosion cannot be improved unless a substantial amount of Cr, Al and/or Ti is added. However, if Cr, Al and/or Ti is added in a too large amount, the magneto-optical properties are lowered. That is, when the period of lamination $\lambda$ of the recording layer 4 is too small, the resistance to corrosion and the magneto-optical properties cannot be consistent with each other. On the other hand, if the period of lamination $\lambda$ of the recording layer 4 is too large, the films cannot be perpendicularly magnetized, which is not preferable.

The thickness of each film is preferably 3 to 30 A. When the thickness of each film is smaller than 3 A, the effect of the alternate lamination is lowered, and when the thickness of each film is larger than 30 A, the vertical magnetic anisotropy deteriorates and a magnetic film exhibiting an excellent squareness cannot be obtained. More preferably, the thickness of the rare earth metal film is 5 to 15 A, and the thickness of the transition metal film is 5 to 20 A.

Further, in the case of the magneto-optical recording medium in accordance with second aspect of the present invention, it is preferred that the uppermost layer and the lowermost layer of the recording layer are respectively formed of the transition metal films containing therein Cr, Al and/or Ti. This further improves the shelf stability.

The amount of Cr, Al and/or Ti to be contained in the transition metal film is preferably 0.5 to 15.0 atomic % of the whole recording layer 4 and more preferably 5.0 to 10.0 atomic % of the same. If the amount is less than 0.5 atomic %, the effect of improving the resistance to corrosion of the recording layer 4 is insufficient, and on the other hand, if the amount is more than 15.0 atomic %, the squareness ratio of the Kerr hysteresis loop deteriorates and the Kerr rotational angle $\theta k$ is reduced. The Cr, Al and/or Ti content can be determined by the atomic absorptiometric analysis, the X-ray fluorometric analysis, the ICP emission spectrum analysis or the like.

The Cr, Al and/or Ti content in the transition metal film can be controlled by adjustment of the Cr, Al and/or Ti content in the second target 10. That is, the second target 10 may be of an alloy of transition metal and at least one of Cr, Al and Ti having a controlled Cr, Al and/or Ti content, or may be a transition metal target having thereon a chip which is formed of at least one of Cr, Al and Ti and is in a controlled amount.

Similarly to the case of the magneto-optical recording medium in accordance with the second aspect, the rare earth metal film may comprise a single heavy or light rare earth metal such as Tb, Gd, Dy, Nd or Sm, may comprise an alloy of such rare earth metals. Among those metals, Tb, Gd, Dy, Nd, TbDy, TbNd, TbGd, or NdDy is preferred. The transition metal film normally comprises FeCr, CoCr or FeCoCr though Ni may be contained in those alloys.

In either of the magneto-optical recording media in accordance with the first and second aspects, it is preferred that the recording layer 4 be sandwiched between a pair of dielectric protective layers in order to improve the shelf stability. Preferably, the protective layer is formed of an oxide, a nitride or a sulfide such as $SiO_x$, $SiN_x$, $AlN_x$, $SiAlON$, $AlNO_x$ or ZnS.

Normally, the thickness of the protective layer may be 400 to 2000 A.

Generally, the substrate is formed of epoxy, polycarbonate, polymethyl methacrylate, glass or the like.

Generally, the dielectric protective layers and the recording layer are formed on the substrate by sputtering. Though various known sputtering methods may

EXAMPLE 1

Magneto-optical recording media A to F were produced by the use of the sputtering system shown in FIG. 3 in the following manner.

The sputter chamber 7 was first evacuated to $5 \times 10^{-7}$ Torr, and then Ar gas was introduced into the sputter chamber 7 through the inlet 16, thereby adjusting the vacuum therein to $5 \times 10^{-3}$ Torr. A polycarbonate substrate 13 with a guide groove was fixed on the substrate holder 12 and the holder 12 was rotated. The substrate 13 was 130 mm in diameter and 1.2 mm in thickness. Then 1 kW RF power was applied to a $Si_3N_4$ target which is 8 inches in diameter, thereby forming 900 A thick $SiN_x$ film on the substrate as the dielectric protective layer 5. Then 1.0 kW RF power and 800 W RF power were simultaneously and respectively applied to the first and second targets 8 and 10. The first target 8 was of FeCo and was 8 inches in diameter, and the second target 10 was of Tb, was 8 inches in diameter and provided with one or more Cr chips 5 mm square. A recording layer 4 comprising alternate transition metal films 2 and rare earth metal films 3 was thus formed on the protective layer 5. The thickness of the recording layer 4 was controlled to 1000 A by adjustment of the sputtering time. Further, the period of lamination $\lambda$ of the recording layer 4 was controlled to 20 A by adjustment of the rotating speed of the substrate holder 12. Further, a dielectric protective layer 6 1000

A thick was formed on the recording layer 4 in the same manner as the protective layer 5.

The rare earth metal films 3 of the magneto-optical recording media A to F respectively contained 0.0 at % Cr, 1 at % Cr, 2 at % Cr, 25 at % Cr, 50 at % Cr and 55 at % Cr.

Each of the targets was at a distance of 150 mm, and the Cr content was adjusted by changing the number of Cr chips on the second target 10. Single-layered rare earth metal films were formed under the same conditions while the number of the Cr chips was changed and the Cr content of the films were measured. Then the measured values of the Cr content were adopted as the Cr contents of the recording layers of the magneto-optical recording media A to F formed by use of the corresponding numbers of Cr chip. It has been found that the values substantially conformed to the result of the composition analysis of the magneto-optical recording media A to F.

For each of the magneto-optical recording media A to F, the Kerr rotational angle $\theta k$ was measured through the Kerr hysteresis loop obtained by application of 16 kOe magnetic field.

Further, each of the magneto-optical recording media A to F was kept under hot and high humidity condition (80° C., 90 RH %), and the time required for the BER (bit error rate) to increase twice as large as the initial value was measured and adopted as the service life of the medium. The shelf stability for each recording medium was evaluated on the basis of the service life.

Figure 4:
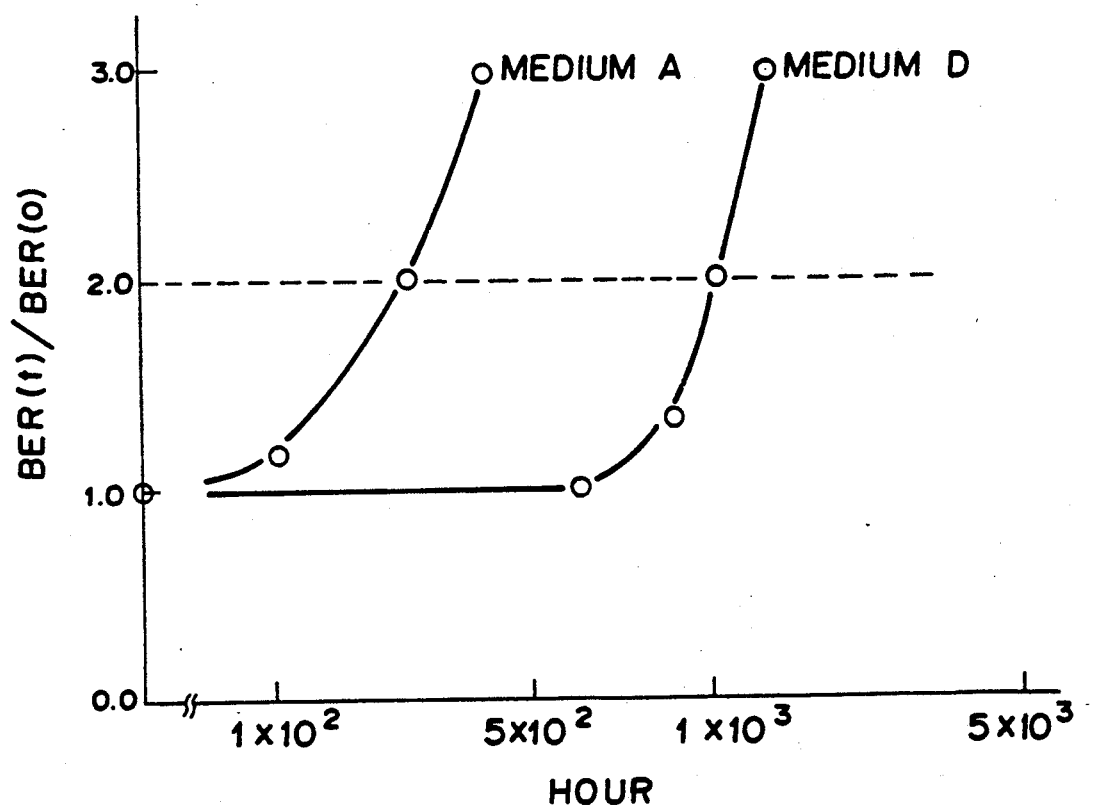
FIG. 4 shows the relation between the time t for which magneto-optical recording media were kept under the hot and high humidity condition and the change of the BER of the media.

FIG. 4 shows the relation between the time t for which the media A and D were kept under the hot and high humidity condition and the change of the BER of the media A and D. The change of the BER were evaluated in the term of the ratio of the BER after the medium was kept under the condition for time t [BER(t)] to the initial BER [BER(0)].

Figure 5:
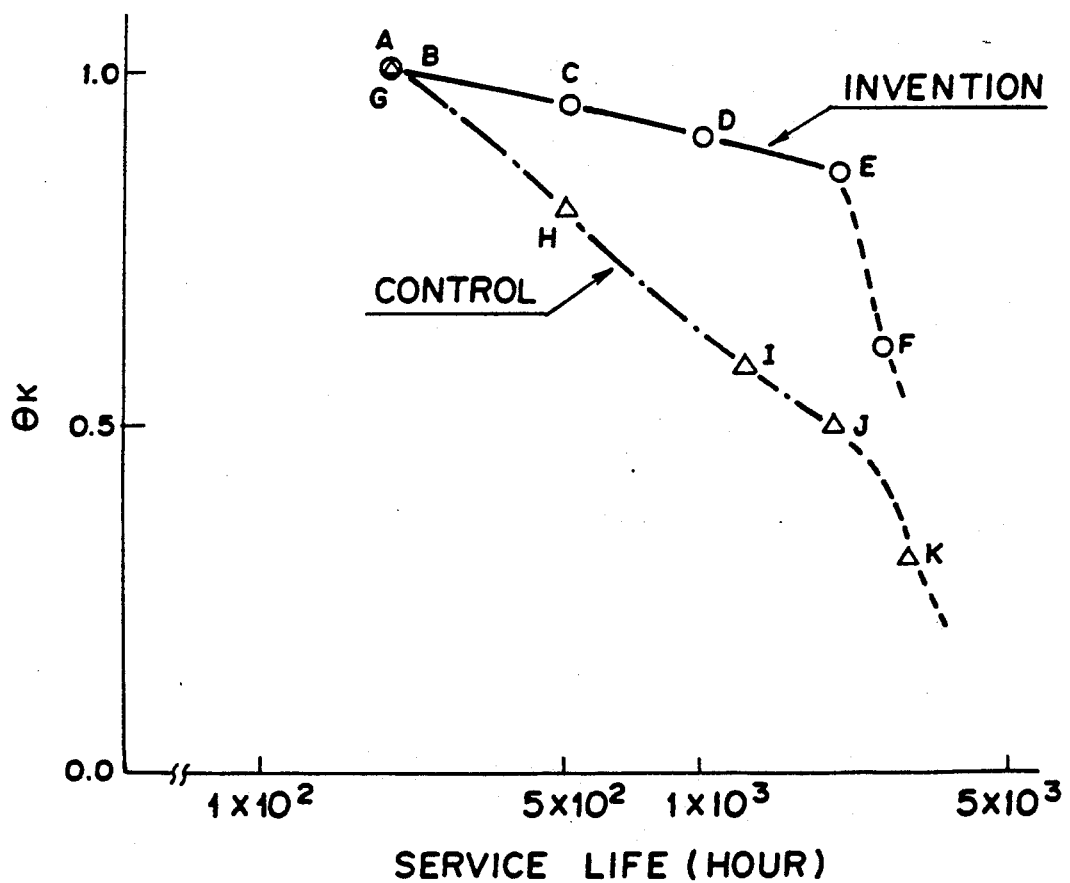
FIG. 5 shows the relation between the Kerr rotational angle $\theta k$ and the service life for the media.

FIG. 5 shows the relation between the Kerr rotational angle $\theta k$ and the service life for the media A to F. The Kerr rotational angle $\theta k$ of the medium A was assumed to be 1 and the Kerr rotational angles $\theta k$ of the other media were shown as relative values to the Kerr rotational angle $\theta k$ of the medium A.

By the use of a FeCo target which was 8 inches in diameter and was provided with one or more Tb chip and Cr chip each 5 mm square, a single layered recording layer was formed on a substrate. In the same manner except the recording layer was formed in this manner, control magneto-optical recording media G to K were formed. The compositions of the recording layers were represented by formula $[Tb_{22}(FeCo)_{78}]_{1-x}Cr_x$.

The Cr content was adjusted by changing the number of Cr chips on the target.

The recording layers of the magneto-optical recording media G to K respectively contained 0.0 at % Cr, 0.4 at % Cr, 10 at % Cr, 18 at % Cr, and 20 at % Cr. The relation between the Kerr rotational angle $\theta k$ and the service life for the media G to K are shown in FIG. 5.

As can be understood from FIG. 5, the Kerr rotational angle $\theta k$ is larger and the service life is longer in the magneto-optical recording medium having a recording layer which consists of a plurality of alternate transition metal films and rare earth metal films and in which Cr is added to the rare earth metal films than in the magneto-optical recording medium having a recording layer which consists of a single layer formed of transition metal and rare earth metal added with Cr. Further, in the former medium, as the amount of Cr added to the rare earth metal film increases, the service life is substantially extended though the Kerr rotational angle $\theta k$ is somewhat reduced. On the other hand, in the latter medium, as the amount of Cr added to the recording layer increases, the Kerr rotational angle $\theta k$ is significantly reduced though the service life is extended.

EXAMPLE 2

Magneto-optical recording media L to N in accordance with the present invention were produced by the use of the sputtering system shown in FIG. 3 in the following manner.

The sputter chamber 7 was first evacuated to $3 \times 10^{-7}$ Torr, and then Ar gas was introduced into the sputter chamber 7 through the inlet 16, thereby adjusting the vacuum therein to a predetermined degree. A polycarbonate substrate 13 with a guide groove was fixed on the substrate holder 12 and the holder 12 was rotated at 13 rpm. The substrate 13 was 130 mm in diameter and 1.2 mm in thickness. Then 1 kW RF power was applied to a sintered SiAlNO target, thereby forming 900 Å thick SiAlNO film on the substrate as the dielectric protective layer 5. Then 390 W RF power and 1300 W DC power were simultaneously and respectively applied to the first and second targets 8 and 10. The first target 8 was of Tb and the second target 10 was of $Fe_{85}Co_{15}$. A recording layer 4 comprising alternate transition metal films 3 and rare earth metal films 2 was thus formed on the protective layer 5. The thickness of the recording layer 4 was controlled to 100 Å. Further, the rotating speed of the substrate holder 12 was changed so that the media L to M differed in the period of lamination $\lambda$ of the recording layer 4 as shown in table 1. Further, a dielectric protective layer 6 1000 Å thick was formed on the recording layer 4 in the same manner as the protective layer 5.

TABLE 1

| media | rpm | period $\lambda(A)$ | thickness of R.M. film | thickness of T.M. film |
|---|---|---|---|---|
| L | 13 | 20 | 8A | 12A |
| M | 26 | 10 | 4A | 6A |
| N | 9 | 30 | 12A | 18A |

R.M. = rare earth metal
T.M. = transition metal

Further, a magneto-optical recording medium O (as a control) was produced in the same manner as the media L to N except that the holder 12 was rotated at 60 rpm. The recording layer of the obtained medium had no period of lamination and was considered to be of a single layer in which rare earth metal and transition metal were uniformly mixed.

Further, magneto-optical recording media P and Q in accordance with the present invention and a magneto-optical recording medium R (as a control) were produced in the same manner as the media L to N except that the second target 10 was formed of the following material.

| Medium P | $(Fe_{85}Co_{15})_{86}Cr_{14}$ |
| Medium Q | $(Fe_{85}Co_{15})_{82}Cr_{18}$ |
| Medium R | $Fe_{85}Co_{15}$ |

Further, magneto-optical recording medium S in accordance with the present invention was produced in the following manner. A dielectric protective layer 5 was first formed in the same manner as used in production of the media L to N, and then only the second target 10 was operated so that a transition metal film about 12 A thick was formed on the protective layer 5. Thereafter, both the first and second targets 8 and 10 were operated and alternate rare earth metal films and transition metal films were formed on the transition metal film. The first and second targets were the same as those used for production of the media L to N, and the power to be applied to the targets and the rotational speed of the holder were controlled so that the thickness of each rare earth metal film obtained was 8 A and the thickness of each transition metal film obtained was 12A. Then, only the second target was operated again and a transition metal film about 12 A thick was formed on the alternate films as the uppermost layer of the recording layer. The other conditions were the same as those used in production of the media L to N. An X-ray diffraction pattern revealed that the period of lamination $\lambda$ of the recording layer of the medium S was 20.3 A.

The magneto-optical properties, dynamic properties such as C/N and BER, and the change in the dynamic properties when the recording media were kept under hot and high humidity condition (80° C., 90 RH %) were evaluated for the recording media L to S, whereby the shelf stability of the media was evaluated. The magneto-optical properties were measured by a Kerr loop hysteresis tracer with a 830 nm laser diode, and the dynamic properties were measured under the condition of 1800 rpm and R=30 or 35 mm at 3.7 MHz. Results are shown in Tables 2 and 3.

TABLE 2

| | (magneto-optical properties) | | |
|---|---|---|---|
| media | $\Theta k$ (deg.) | coercive force Hc(Oe) | squareness ratio |
| L | 0.9 | 12000 | 1.0 |
| M | 0.9 | 14000 | 1.0 |
| N | 0.8 | 8000 | 1.0 |
| O | 0.7 | 7000 | 0.9 |
| P | 0.8 | 10000 | 1.0 |
| Q | 0.7 | 8000 | 0.9 |
| R | 0.9 | 14000 | 1.0 |
| S | 0.9 | 12000 | 1.0 |

TABLE 3

| | (dynamic properties and shelf stability) | |
|---|---|---|
| media | initial properties C/N(dB) BER | shelf stability C/N(dB) BER |
| L | 49  $2 \times 10^{-5}$ | 49 $2.1 \times 10^{-5}$ |
| M | 49 $1.8 \times 10^{-5}$ | 49 $1.8 \times 10^{-5}$ |
| N | 48 $1.7 \times 10^{-5}$ | 48 $1.8 \times 10^{-5}$ |
| O | 46 $1.9 \times 10^{-5}$ | 46 $2.1 \times 10^{-5}$ |
| P | 48 $2.0 \times 10^{-5}$ | 48 $2.0 \times 10^{-5}$ |
| Q | 46 $2.2 \times 10^{-5}$ | 46 $2.2 \times 10^{-5}$ |
| R | 49 $2.7 \times 10^{-5}$ | 45 $2.7 \times 10^{-5}$ |
| S | 49 $1.9 \times 10^{-5}$ | 49 $1.9 \times 10^{-5}$ |

As can be understood from the tables, the magneto-optical recording medium D which had a single-layered recording layer 4 was inferior to the magneto-optical recording media L to N in accordance with the present invention in both the magneto-optical properties and the shelf stability. Further, the magneto-optical recording medium R which was not added with Cr, Al or Ti was substantially inferior to the media in accordance with the present invention in the shelf stability though the magneto-optical properties of the former were substantially equivalent to those of the latter. Especially, the BER of the former significantly increased with time.

We claim:

1. A magneto-optical recording medium having a substrate and a recording layer which is formed on the substrate and is in the form of a thin film containing rare earth metal and transition metal as the major components characterized in that said recording layer comprises a plurality of transition metal films and a plurality of rare earth metal films, which are formed as separate film layers on the substrate and which are alternately formed one on the other, wherein at least a metal selected from the group consisting of Cr, Al and Ti is contained substantially only in the rare earth metal films.

2. A magneto-optical recording medium as defined in claim 1 in which said metal selected from the group consisting of Cr, Al and Ti is Cr.

3. A magneto-optical recording medium as defined in claim 1 in which the amount of said metal selected from the group consisting of Cr, Al and Ti to be contained in the rare earth metal film is 0.4 to 18.0 atomic % of the whole recording layer.

4. A magneto-optical recording medium as defined in claim 1 in which the period of lamination of the recording layer is 6 to 60 A.

5. A method of producing a magneto-optical recording medium having a substrate and a recording layer formed thereon, the recording layer being formed of a plurality of transition metal films and a plurality of rare earthy metal films which are formed as separate film layers on the substrate and which are alternately formed one on the other and at least a metal selected from the group consisting of Cr, Al and Ti being contained substantially only in the rare earth metal films, said method characterized in that first and second targets are disposed in a sputter chamber which is kept at a predetermined vacuum, and the first and second targets are simultaneously and continuously sputtered while a substrate is passed alternately above the first and second targets at a predetermined distance therefrom at a constant speed, the first target being formed of a transition metal and the second target being formed of rare earth metal wherein said second target alone includes at least a metal selected from the group consisting of Cr, Al and Ti.

6. A magneto-optical recording medium having a substrate and a recording layer which is formed on the substrate and is in the form of a thin film containing rare earth metal and transition metal as the major components characterized in that said recording layer comprises a plurality of transition metal films and a plurality of rare earth metal films, which are formed as separate film layers on the substrate and which are alternately formed one on the other, wherein at least a metal selected from the group consisting of Cr, Al and Ti is contained substantially only in the transition metal films.

7. A magneto-optical recording medium as defined in claim 6 in which said metal selected from the group consisting of Cr, Al and Ti is Cr.

8. A magneto-optical recording medium as defined in claim 6 in which the amount of said metal selected from the group consisting of Cr, Al and Ti to be contained in the transition metal film is 0.2 to 15.0 atomic % of the whole recording layer.

9. A magneto-optical recording medium as defined in claim 6 in which the period of lamination of the recording layer is 6 to 60 Å.

10. A magneto-optical recording medium as defined in claim 6 in which the uppermost and lowermost layers of said recording layer are of transition metal.

11. A method of producing a magneto-optical recording medium having a substrate and a recording layer formed thereon, the recording layer being formed of a plurality of transition metal films and a plurality of rare earth metal films which are formed as separate film layers on the substrate and which are alternately formed one on the other and at least a metal selected from the group consisting of Cr, Al and Ti being contained substantially only in the transition metal films, said method characterized in that first and second targets are disposed in a sputter chamber which is kept at a predetermined vacuum, and the first and second targets are simultaneously and continuously sputtered while a substrate is passed alternately above the first and second targets at a predetermined distance therefrom at a constant speed, the first target being formed of rare earth metal and the second target being formed of transition metal wherein said second target alone includes at least a metal selected from the group consisting of Cr, Al and Ti.

* * * * *